(12) United States Patent
Lee et al.

(10) Patent No.: US 7,937,522 B2
(45) Date of Patent: May 3, 2011

(54) METHOD FOR FLASH MEMORY DATA MANAGEMENT

(75) Inventors: Chun-Kun Lee, Jhubei (TW); Wei-Yi Hsiao, Jhubei (TW)

(73) Assignee: Siliconmotion Inc., Hsinchu County (TW)

( * ) Notice: Subject to any disclaimer, the term of this patent is extended or adjusted under 35 U.S.C. 154(b) by 508 days.

(21) Appl. No.: 11/699,372

(22) Filed: Jan. 30, 2007

(65) Prior Publication Data

US 2008/0120456 A1 May 22, 2008

(30) Foreign Application Priority Data

Nov. 20, 2006 (TW) .............................. 95142873 A

(51) Int. Cl.
*G06F 13/00* (2006.01)

(52) U.S. Cl. ....................................... 711/103; 711/156

(58) Field of Classification Search .................. 711/103, 711/156

See application file for complete search history.

(56) References Cited

U.S. PATENT DOCUMENTS

| 5,388,083 | A | * | 2/1995 | Assar et al. | ............ | 365/185.33 |
| 5,479,638 | A | * | 12/1995 | Assar et al. | .................. | 711/103 |
| 5,485,595 | A | * | 1/1996 | Assar et al. | .................. | 711/103 |
| 5,640,349 | A | * | 6/1997 | Kakinuma et al. | ........ | 365/185.33 |
| 6,016,472 | A | * | 1/2000 | Ali | ................. | 704/500 |
| 6,076,137 | A | * | 6/2000 | Asnaashari | ................... | 711/103 |
| 6,115,289 | A | * | 9/2000 | Sin | ........................... | 365/185.23 |
| 6,381,176 | B1 | | 4/2002 | Kim et al. | | |
| 6,662,314 | B1 | * | 12/2003 | Iwata et al. | ..................... | 714/42 |
| 6,704,835 | B1 | * | 3/2004 | Garner | ........................ | 711/103 |
| 6,760,805 | B2 | | 7/2004 | Lasser | | |
| 6,775,698 | B1 | * | 8/2004 | Simone | ........................ | 709/221 |
| 6,831,865 | B2 | | 12/2004 | Chang et al. | | |
| 7,089,349 | B2 | | 8/2006 | Chang et al. | | |
| 7,170,856 | B1 | * | 1/2007 | Ho et al. | ........................ | 370/230 |
| 7,467,251 | B2 | * | 12/2008 | Park et al. | ...................... | 710/307 |
| 2003/0124975 | A1 | * | 7/2003 | Ram et al. | ..................... | 455/12.1 |
| 2004/0049627 | A1 | * | 3/2004 | Piau et al. | ..................... | 711/103 |
| 2005/0204187 | A1 | * | 9/2005 | Lee et al. | ........................ | 714/8 |
| 2006/0036897 | A1 | * | 2/2006 | Lin et al. | ............................ | 714/5 |
| 2007/0207800 | A1 | * | 9/2007 | Daley et al. | ................... | 455/425 |
| 2007/0283428 | A1 | * | 12/2007 | Ma et al. | ............................ | 726/9 |

* cited by examiner

*Primary Examiner* — Reba I Elmore
(74) *Attorney, Agent, or Firm* — Ditthavong Mori & Steiner, P.C.

(57) ABSTRACT

The method for managing flash memory data includes the following steps. When data are first transmitted from a host and the address for the data indicates a temporary address, then temporary data are retrieved from the temporary address to an external buffer. A writing command is then executed and the temporary data having a destination address are written to a flash buffer. When the buffer of the flash memory is not full, the buffer data are written into a temporary block. The method of writing the buffer data into the temporary block includes using a address changing command, or executing a writing command to rewrite the external buffer data to the flash buffer so that the data are written into the temporary block.

19 Claims, 4 Drawing Sheets

METHOD FOR FLASH MEMORY DATA MANAGEMENT

RELATED APPLICATIONS

The present application is based on, and claims priority from, Taiwan Application Serial Number 95142873, filed Nov. 20, 2006, the disclosure of which is hereby incorporated by reference herein in its entirety.

BACKGROUND OF THE INVENTION

1. Field of Invention

The invention relates to data management and, in particular, to a method for managing data which is stored in the flash memory.

2. Related Art

Flash memory is a kind of storage system with the advantages of high access speed and high stability. It is non-volatile memory. That is, once data are stored in the flash memory, it no longer needs power to maintain the data.

The structure of the flash memory is in units of blocks. Each block is further divided into pages or sections. If data need to be written into the flash memory, a data writing command is executed to write data in an external buffer into the buffer of the flash memory before writing it into the flash memory. Under the condition that NOP is 1, the data in the memory page can be only written once. In practice, it is likely to occur that data cannot fully occupy a flash memory block or the data storage is not continuous. In these cases, the storage efficiency of the flash memory is reduced. Data defragmentation is employed to solve this problem. However, it requires a lot of time to reorganize data in the flash memory. In particular, once a destination address of the external buffer is assigned to the data, the current structure does not allow one to change the destination address of the data already stored in the buffer of the flash memory or read the data out of the buffer of the flash memory. Moreover, such a structure is not suitable for speeding up the data defragmentation.

It is therefore desirable to provide a new method for managing flash memory data to prevent from spending a lot of time re-organizing data therein because of loose or discontinuous data distribution. The data storage ability of the flash memory is better optimized by reducing the dependence on the external buffer.

SUMMARY OF THE INVENTION

An objective of the invention is to provide a method for managing flash memory data to reduce the amount of time for re-organizing data therein because of loose or discontinuous data distribution, thereby increasing the data storage efficiency thereof.

In accord with the above-mentioned objective, the invention provides a method for managing flash memory data comprising the steps of: (a) writing data in an external buffer to a buffer of the flash memory, wherein the data in the buffer of the flash memory has a destination address; and (b) checking the data stored in the buffer of the flash memory and using an address changing command to assign a temporary address to the data stored in the buffer of the flash memory and to write the data into the temporary block when the buffer of the flash memory is not full.

In accord with the above-mentioned objective, the invention provides a method for managing flash memory data comprising the steps of: (a) writing data in an external buffer to a buffer of the flash memory, wherein the data in the buffer of the flash memory has a destination address; and (b) checking the data stored in the buffer of the flash memory and using a writing changing command when the buffer of the flash memory is not full, wherein the writing command deletes the data in the buffer of the flash memory and re-assigns an temporary address to the data; (c) writing the data in the external buffer to the buffer of the flash memory, wherein the data in the buffer of the flash memory have the temporary address; and (d) writing the data to a temporary block according to the temporary address.

In accord with the above-mentioned objective, the invention provides a method for managing flash memory data comprising the steps of: (a) determining an address for transmitting data by a host, wherein the address is an original destination address; (b) waiting for the host to transmit the data to an external buffer; (c) determining whether the data are first transmitted to the external buffer and, when the data are first transmitted, determining whether the address assigned by the host is a temporary address and, when the assigned address is a temporary address, reading temporary data in the temporary address to the external buffer, and executing a writing command to re-assign a new destination address; (d) writing the temporary data in the external buffer to a buffer of the flash memory; and (e) writing the data transmitted from the host in the external buffer to the buffer of the flash memory, wherein the data in the buffer of the flash memory have the original or new destination address.

If the data are first transmitted to the external buffer, then step (e) is executed directly. When the data are first transmitted to the external buffer and the host assigned data transmission address is not the temporary address, an algorithm is executed, followed by step (e). The algorithm includes organizing the data in the external buffer so that they become continuous.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

The disclosed method for managing flash memory data writes data into a destination block when a buffer of the flash memory is full and into a temporary block when it is not full. Another method for managing flash memory data according to the invention is for the case when data are first transmitted from a host and the writing address of the data is a temporary address. In this case, temporary data are read to the external buffer and a writing command is executed to write the temporary data with a destination address to the buffer of the flash memory. Therefore, the invention can reduce the loose or discontinuous data distribution and the amount of time for re-organizing flash memory data. Moreover, it reduces the dependence on the external buffer to increase the data storage ability thereof.

Figure 1:
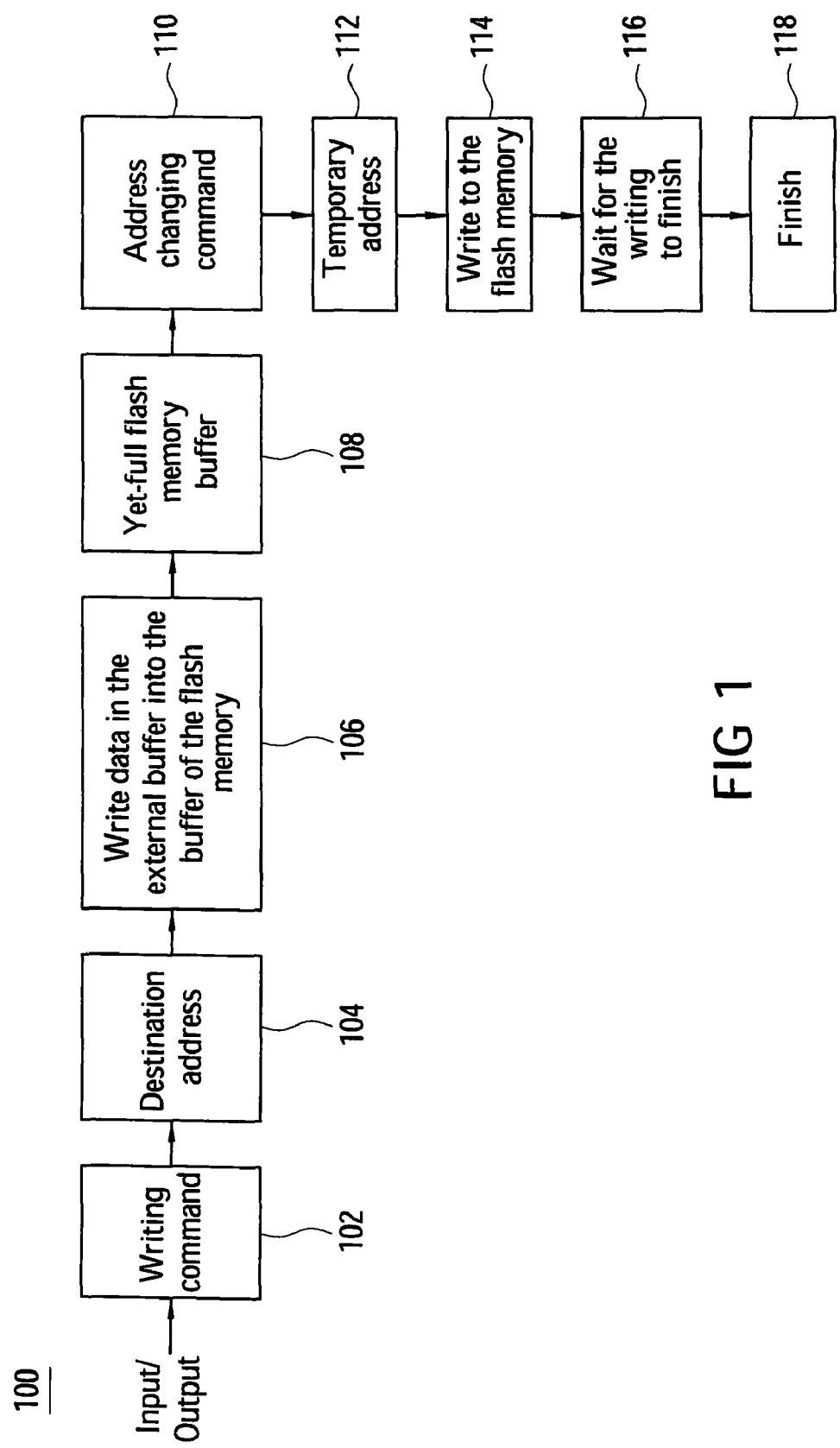
FIG. 1 is a schematic view showing the flowchart of an embodiment of the invention.

The procedure of an embodiment of the invention is depicted in FIG. 1. Steps 102 and 104 takes a data writing command and a data address (e.g., using 5 cycles to transmit data with a destination address), respectively. They are used to write data in an external buffer to a buffer of the flash memory (step 106). The written data has a destination address. Step 108 checks the data stored in the buffer of the flash memory. When the buffer of the flash memory is not fill, an address changing command is used (step 110) to assign a temporary address to the data in the buffer of the flash memory (step 112). The data are then written to a temporary block of the flash memory (step 114). Steps 116 and 118 complete writing the data.

Figure 2:
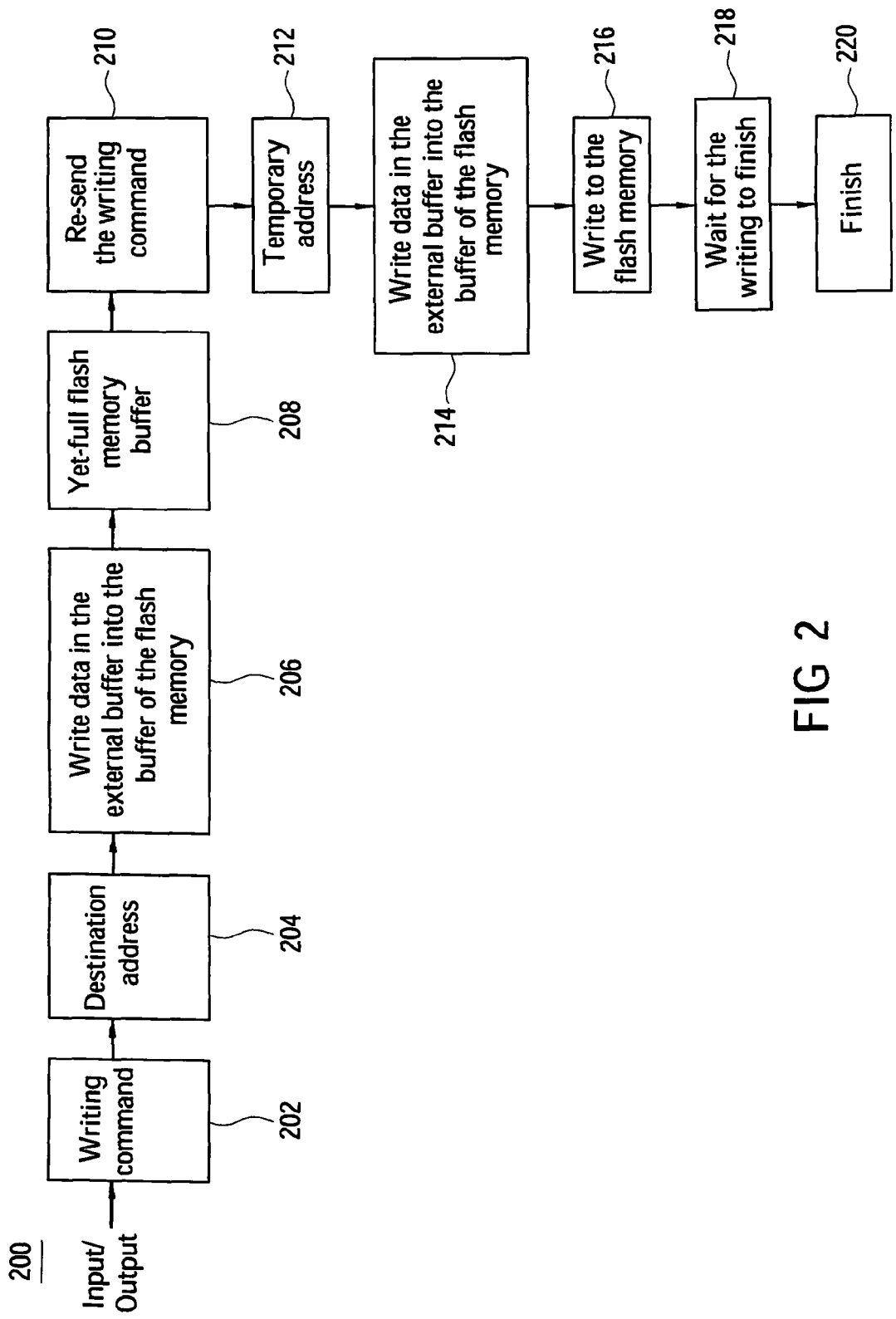
FIG. 2 is a schematic view showing the flowchart of another embodiment of the invention.

With reference to FIG. 2, steps 202 and 204 take a data writing command and a data address (e.g., using 5 cycles to transmit data with a destination address), respectively. They are used to write data in an external buffer to a buffer of the flash memory (step 206). The written data has a destination address. Step 208 checks the data stored in the buffer of the flash memory. When the buffer of the flash memory is not full, step 210 executes a writing command. The writing command deletes the buffer inside the buffer of the flash memory and re-assigns a temporary address to the data in the buffer of the flash memory (step 212). Step 214 re-writes the buffer in the external buffer to the buffer of the flash memory. The data in the buffer of the flash memory has the temporary address. Step 216 writes the data to a temporary block of the flash memory according to the temporary address. Steps 218 and 220 complete writing the data.

Figure 3:
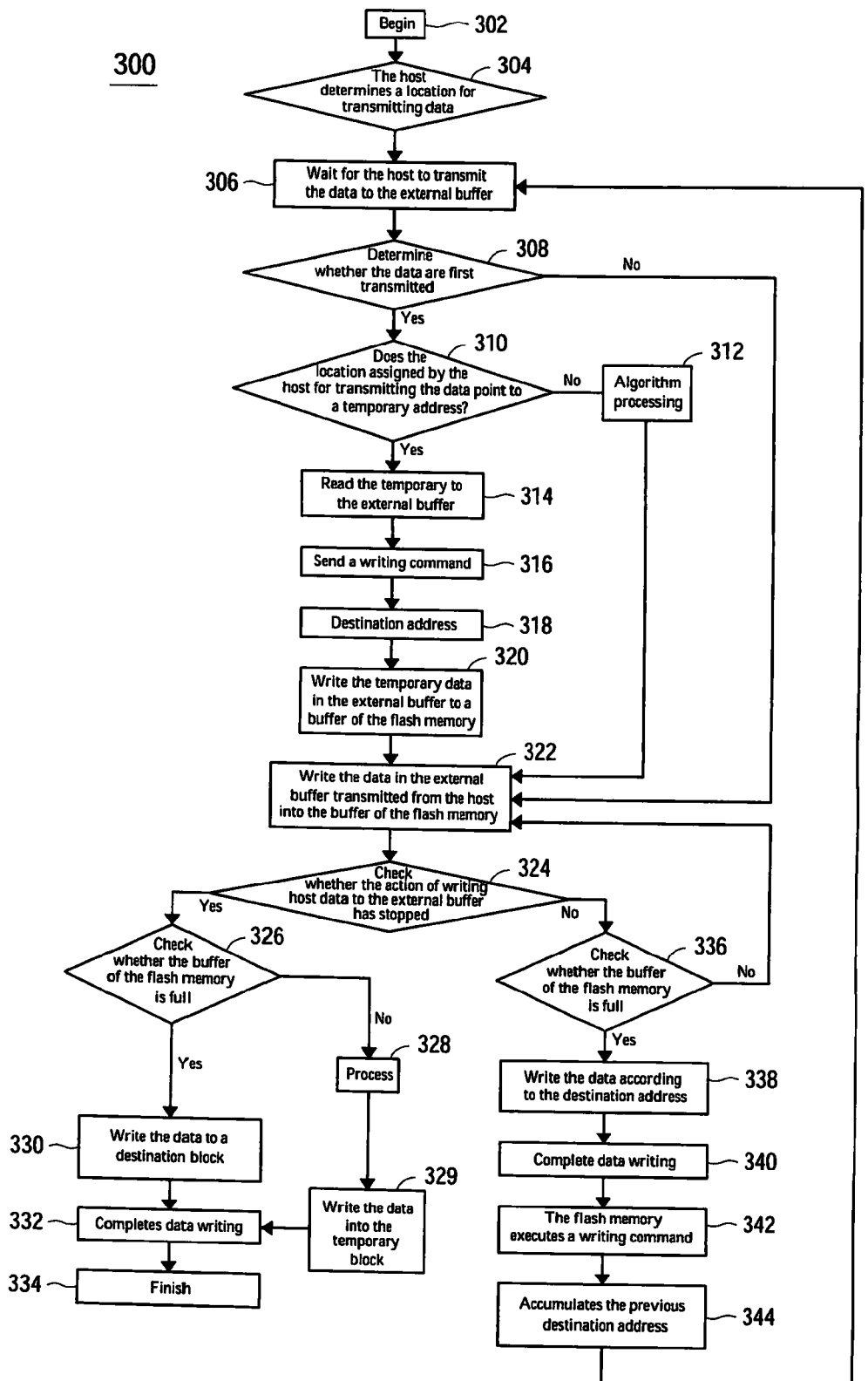
FIG. 3 is a schematic view showing the flowchart of yet another embodiment of the invention.

Please refer to FIG. 3. In step 304, a host determines a location for transmitting data. The location is an original destination address. Step 306 waits for the host to transmit the data to an external buffer. Step 308 determines whether the data are first transmitted to the external buffer. Step 310 determines whether the location assigned by the host for transmitting the data is pointed to a temporary address. In step 314, when the location assigned by the host for transmitting data points to the temporary address, then temporary data in the temporary address are read to the external buffer. Afterwards, steps 316 and 318 execute a writing command for re-assigning an address as a new destination address. Step 320 writes the temporary data in the external buffer to a buffer of the flash memory. Step 322 writes the data in the external buffer transmitted from the host into the buffer of the flash memory. The data in the buffer of the flash memory has the original destination address or the new destination address.

More explicitly, in step 308, when the data are not first transmitted to the external buffer, step 322 is executed directly to write the data in the external buffer transmitted from the host into the buffer of the flash memory. Alternative, if in step 308 the data are first transmitted to the external buffer and the location assigned by the host for data transmission in step 310 does not point to a temporary address, then step 312 executes algorithm to organize the data in the external buffer so that they become continuous. Afterwards, step 322 is performed to write the data in the external buffer transmitted from the host to the buffer of the flash memory.

After the data transmitted from the host to the external buffer are written into the buffer of the flash memory, step 324 checks whether the action of writing host data to the external buffer has stopped. After it is stopped, step 326 checks whether the buffer of the flash memory is full. When it is full, step 330 is performed to write data with a destination address to a destination block. The destination address is either the original destination address or the new destination address. If the buffer of the flash memory is found to be not full in step 326, step 328 assigns a temporary block to the data. Step 329 writes the data to the temporary block. Step 332 completes writing data to the flash memory. Step 334 finishes the data writing to the flash memory.

Step 328 involves the disclosed method of moving data in the yet full buffer of the flash memory to the temporary block. As shown in FIG. 1, when the buffer of the flash memory is not full, an address changing command is used to assign a temporary address to the data in the buffer of the flash memory, writing the data to the temporary block. Alternatively, as shown in FIG. 2, if the buffer of the flash memory is not full, a writing command is executed. The writing command deletes the data inside the buffer of the flash memory and re-assigns a temporary address. The data in the external buffer are then written into the buffer of the flash memory. The data inside the buffer of the flash memory have a temporary address and are written into the temporary block accordingly.

After writing the data transmitted from the host to the external buffer into the buffer of the flash memory, step 324 checks whether the action of writing the host data to the external buffer has been stopped. If the writing is not over yet, step 336 checks the data stored in the buffer of the flash memory. If the buffer of the flash memory is full, then step 338 writes the data according to their destination address to a destination block. Step 340 completes writing the data to the destination block. In step 342, the flash memory executes a writing command. Step 344 accumulates the destination address (e.g., accumulating the previous writing address). Afterwards, the procedure goes to step 306, followed by the above-mentioned steps. The destination address is either the original destination address of the new destination address.

When the data are still being transmitted from the host to the external buffer, step 336 checks the data stored in the buffer of the flash memory. If the buffer of the flash memory is not full, the procedure goes to step 322 to write the data transmitted from the host to the external buffer into the buffer of the flash memory.

Figure 4:
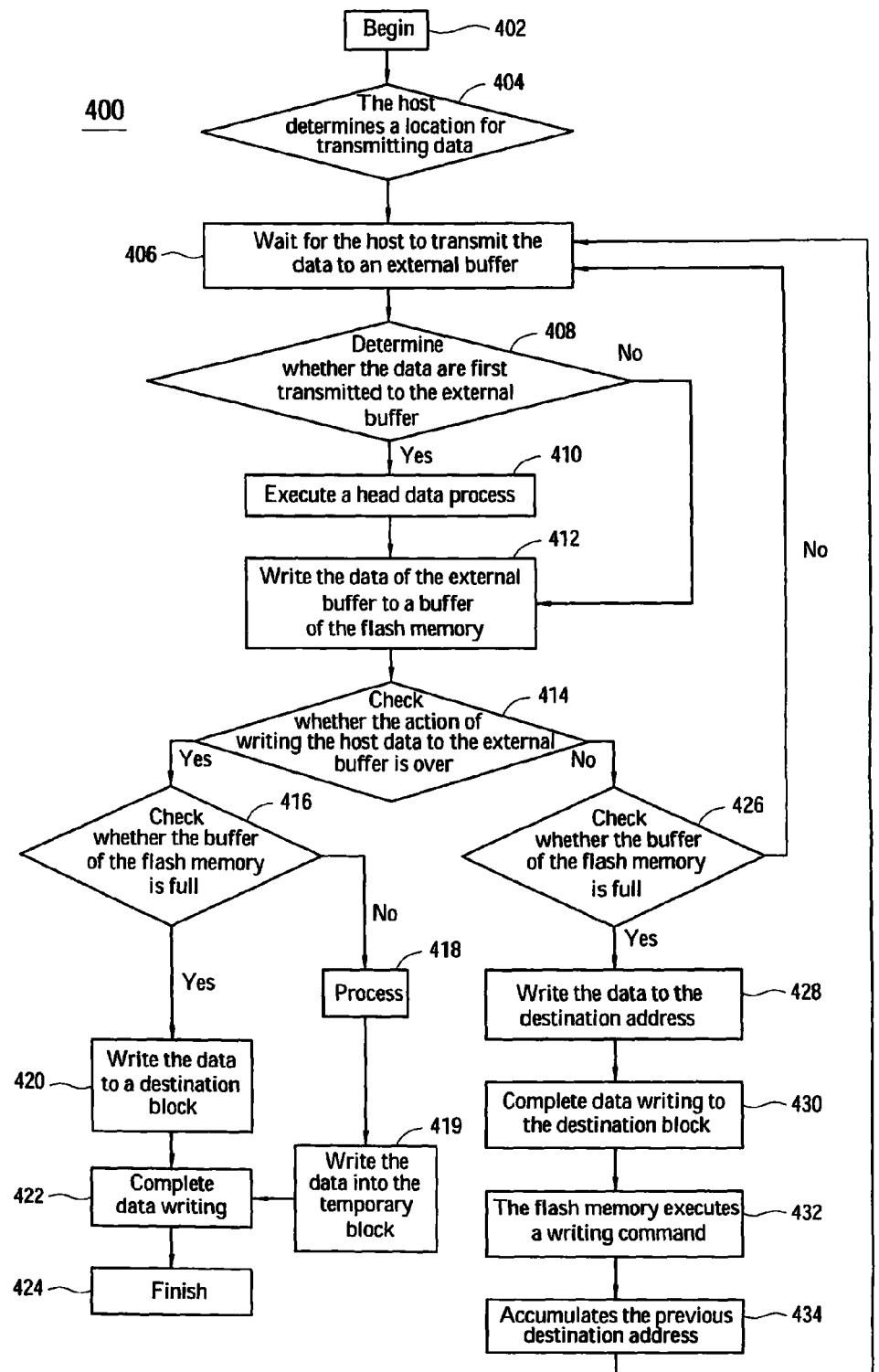
FIG. 4 is a schematic view showing the application of the invention according to the flowchart of FIG. 1 or FIG. 2.

As shown in flowchart 400 of FIG. 4, a host determines a location for transmitting data (e.g. a continuous series of data) in step 404. The location is a destination address. Step 406 waits for the host to transmit the data to an external buffer. Step 408 determines whether the data are first transmitted to the external buffer. If the data are first transmitted to the external buffer, step 410 executes a head data process to simplify subsequent data accesses. Step 412 writes the data of the external buffer to a buffer of the flash memory. The data in the buffer of the flash memory has a destination address.

After the host transmits the data to the external buffer, the procedure determines whether the data are first transmitted to the external buffer. If the data are first transmitted to the external buffer, step 412 is directly performed to write the data in the external buffer into the buffer of the flash memory.

Step 414 checks whether the action of writing the host data to the external buffer is over. If it is not over, then step 426 checks the data stored in the buffer of the flash memory. Once the buffer of the flash memory is full, step 428 writes the data according to the destination address to a destination block. Step 430 completes writing the data to the destination block. In step 432, the flash memory executes a writing command. Step 434 accumulates the destination address (e.g., accumulating the previous writing address). Afterwards, the procedure goes back to step 406, followed by the above-mentioned steps.

When the data are still being written to the external buffer and the buffer of the flash memory is not full in step 426, the procedure goes back to step 406 to continue the above-mentioned steps.

Step 414 checks whether the action of writing the host data to the external buffer is over. When it is over, step 416 checks the data stored in the buffer of the flash memory. Once the buffer of the flash memory is full, step 420 is executed to write the data with the destination address into a destination block.

Once the action of writing the host data into the external buffer is over and the buffer of the flash memory is found to be not full in step 416, then step 418 assigns a temporary block to the data. The data are written into the temporary block in step 419. Step 422 completes writing the data into the flash memory. Step 424 finishes the action of writing the data to the flash memory.

Step 418 involves the disclosed method of moving the data in the yet full buffer of the flash memory into the temporary block. As illustrated in FIG. 1, when the buffer of the flash memory is not full, an address changing command is used to assign a temporary address to the data in the buffer of the flash memory for writing the data to the temporary block. Alternatively, as shown in FIG. 2, when the buffer of the flash memory is not full, a writing command is executed. The writing command deletes the data stored in the buffer of the flash memory and re-assigns a temporary address. The data in the external buffer are then written to the buffer of the flash memory. The data in the buffer of the flash memory has a temporary address and are written into the temporary buffer accordingly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for managing flash memory data, comprising the steps of:
   (a) writing data in an external buffer to a buffer of a flash memory, wherein the data in the buffer of the flash memory has a destination address; and
   (b) checking the data stored in the buffer of the flash memory and, only when the buffer of the flash memory is not full, using an address changing command to assign a temporary address to the data in the buffer of the flash memory for writing the data into a temporary block within the flash memory.

2. The method of claim 1, wherein when the buffer of the flash memory is full the data are written into a destination block within the flash memory according to the destination address.

3. The method of claim 1, wherein step (a) is preceded by the step of:
   (c) waiting for a host to transmit the data to the external buffer, determining whether the data are first transmitted to the external buffer, and executing step (a) when the data are not first transmitted to the external buffer.

4. The method of claim 3, wherein step (c) is preceded by the step of determining a location for transmitting the data by the host and the location is the destination address.

5. The method of claim 3, wherein step (b) is preceded by the step of checking whether the action of writing the host data to the external buffer has stopped and executing step (b) when it has stopped.

6. The method of claim 3, wherein step (b) is preceded by the step of checking whether the action of writing the host data to the external buffer has stopped, when the data are still being written to the external buffer, checking the data stored in the buffer of the flash memory, and returning to step (c) when the buffer of the flash memory is not full.

7. The method of claim 6, wherein when the data are still being written to the external buffer and the buffer of the flash memory is full the data are written into a destination block within the flash memory according to the destination address, and when the data are completely written to the destination block the flash memory executes a writing command and accumulates the destination address, followed by step (c).

8. A method for managing flash memory data, comprising the steps of:
   (a) writing data in an external buffer to a buffer of a flash memory, wherein the data in the buffer of the flash memory has a destination address; and
   (b) checking the data stored in the buffer of the flash memory and using an address writing command only when the buffer of the flash memory is not full, wherein the writing command re-assigns a temporary address to the data;
   (c) writing the data in the external buffer to the buffer of the flash memory, wherein the data have the temporary address; and
   (d) writing the data into a temporary block within the flash memory according to the temporary address.

9. The method of claim 8, wherein the data are written into a destination block within the flash memory according to the destination address when the buffer of the flash memory is full.

10. The method of claim 8, wherein step (a) is preceded by the step of:
    (e) waiting for a host to transmit the data to the external buffer, determining whether the data are first transmitted to the external buffer, followed by step (a) when the data are first transmitted.

11. The method of claim 10, wherein step (e) is preceded by the step of determining a location for transmitting the data by the host, the location being the destination address.

12. The method of claim 10, wherein step (b) is preceded by the step of checking whether the action of writing the host data to the external buffer is over and executing step (b) if the data are completely written into the external buffer.

13. The method of claim 10, wherein step (b) is preceded by the step of checking whether the action of writing the host data to the external buffer is over and checking the data stored in the buffer of the flash memory when the data are still being written to the external buffer or returning to step (e) when the buffer of the flash memory is not full.

14. The method of claim 13 further comprising the step of writing the data to a destination block within the flash memory according to the destination address when the data are still being written to the external buffer and the buffer of the flash memory is full and the step of executing a writing command by the flash memory and accumulating the destination address once the data are completely written into the destination block, followed by step (c).

15. A method for managing flash memory data, comprising the steps of:
    (a) determining a location for transmitting data by a host, wherein the location is an original destination address;
    (b) waiting for the host to transmit the data to an external buffer;
    (c) determining whether the data are first transmitted to the external buffer, determining whether the location assigned by the host to the data points to a temporary address when the data are first transmitted to the external buffer, reading the data from a temporary block of the temporary address to the external buffer when the location points to the temporary address, and executing a writing command to re-assign a new destination address;

(d) writing the data in the temporary block of the external buffer to a buffer of a flash memory; and (e) writing the data transmitted from the host to the external buffer into the buffer of the flash memory, the data in the buffer of the flash memory having the original destination address or the new destination address;

wherein step (e) is directly executed when the data are not first transmitted to the external buffer or is preceded by the step of executing an algorithm when the data are first transmitted to the external buffer and the location assigned by the host for transmitting data does not point to the temporary address, the algorithm organizing the data contained in the external buffer so that the data become continuous.

16. The method of claim 15, wherein step (e) is followed by the step of checking whether the action of writing the host data to the external buffer is over and, when the data are completely written into the external buffer, executing the steps of:

(f) checking the data stored in the buffer of the flash memory and executing step (g) if the buffer of the flash memory is full or executing step (h) if the buffer of the flash memory is not full;

(g) writing the data to a destination block within the flash memory according to the destination address, wherein the destination address is either the original destination address or the new destination address; and (h) assigning a temporary block within the flash memory to the data and writing the data into the temporary block.

17. The method of claim 16, wherein step (h) uses an address changing command to assign a temporary address to the data in the buffer of the flash memory for writing the data into the temporary block.

18. The method of claim 16, wherein step (h) further comprises the steps of:

(i) executing a writing command to delete the data in the buffer of the flash memory and to re-assign a temporary address; and (j) writing the data in the external buffer into the buffer of the flash memory, wherein the data in the buffer of the flash memory has the temporary address and the data are written into the temporary block according to the temporary address.

19. The method of claim 15, wherein step (e) is followed by the step of checking whether the action of writing the host data to the external buffer is over and, when the data are still being written from the host into the external buffer, executing the steps of:

(f) checking the data stored in the buffer of the flash memory, returning to step (e) if the buffer of the flash memory is not full or writing the data to a destination block within the flash memory according to the destination address if the buffer of the flash memory is full, executing a writing command and accumulating the destination address, followed by step (b), wherein the destination address is the original destination address or the new destination address.

* * * * *